United States Patent
Hoejberg

(10) Patent No.: US 12,458,523 B2
(45) Date of Patent: Nov. 4, 2025

(54) NAIL CORRECTION KIT

(71) Applicant: L/N HEALTH AND BEAUTY APS, Lystrup (DK)

(72) Inventor: Diana Hoejberg, Risskov (DK)

(73) Assignee: NEUBOURG SKIN CARE GMBH, Greven (DE)

( * ) Notice: Subject to any disclaimer, the term of this patent is extended or adjusted under 35 U.S.C. 154(b) by 386 days.

(21) Appl. No.: 18/092,568

(22) Filed: Jan. 3, 2023

(65) Prior Publication Data
US 2023/0149202 A1    May 18, 2023

Related U.S. Application Data

(62) Division of application No. 16/612,845, filed as application No. PCT/IB2018/053356 on May 14, 2018, now abandoned.

(30) Foreign Application Priority Data

May 12, 2017   (DE) .................... 10 2017 004 546.1

(51) Int. Cl.
A61F 5/11        (2006.01)

(52) U.S. Cl.
CPC ..................................... *A61F 5/11* (2013.01)

(58) Field of Classification Search
CPC .......... A61F 5/11; A61F 5/019; A61F 5/0585; A61F 13/10; A61F 5/05866; A61F 5/05875; A61F 5/50; A61F 5/0118; A61F 5/3723; A61K 8/8117; A61K 8/817; A61K 2800/81; A61Q 3/02
See application file for complete search history.

(56) References Cited

U.S. PATENT DOCUMENTS

| | | | |
|---|---|---|---|
| 3,981,298 A | 9/1976 | Mronda | |
| 2007/0142498 A1 | 6/2007 | Brennan et al. | |
| 2011/0301313 A1* | 12/2011 | Sunaga | B82Y 40/00 264/225 |
| 2012/0191033 A1* | 7/2012 | Hillebrand | A61K 8/817 604/20 |
| 2016/0220474 A1* | 8/2016 | Flint | A61K 8/35 |

FOREIGN PATENT DOCUMENTS

| | | |
|---|---|---|
| DE | 44 46 650 | 6/1996 |
| EP | 2829255 | 1/2015 |
| WO | 2011/039243 | 4/2011 |

OTHER PUBLICATIONS

Alex G. Universal adhesives: the next evolution in adhesive dentistry? Compend Contin Educ Dent. Jan. 2015;36(1):15-26; quiz 28, 40. Review. PubMed PMID: 25822403.

Alvermann, et al. "Physiologische und schmerzfreie Behandlung von eingewochsenen und eingerollten Nageln. Erhohung der Kompositbindung zur Nogelkorrektur ouf Nogeloberflachen durch einen speziellen Haftvermittler" Kosmetische Medizin 2.19, pp. 88-91 and english translation thereof.

\* cited by examiner

*Primary Examiner* — Ophelia A Hawthorne
(74) *Attorney, Agent, or Firm* — Kaplan Breyer Schwarz LLP; Stuart H. Mayer

(57) ABSTRACT

The present invention relates to a kit for performing a nail correction method for a human or animal toenail or fingernail.

11 Claims, 2 Drawing Sheets

NAIL CORRECTION KIT

CROSS-REFERENCE TO RELATED APPLICATION

This application is a divisional of U.S. Ser. No. 16/612,845, filed Nov. 12, 2019, which is a 371 National Phase of International Application No. PCT/IB2018/053356, filed May 14, 2018, which claims the benefit of DE 10 2017 004 546.1, filed May 12, 2017, the contents of which are incorporated herein by reference.

BACKGROUND OF THE INVENTION

The present invention relates to a kit for performing a nail correction method for a human or animal toenail or fingernail. The application claims priority of the prior application DE 102017004546.1 (date of filing: 12 May 2017).

Various methods are known to correct toenails or fingernails. Such nails frequently have a strong curvature causing them to press or grow into the nail bed. A common way of treatment is to remove the complete nail by surgery. The treatment is not only painful, but often does not result in a nail correction: The newly growing nail is frequently as curved as the original one nail was.

An alternative, non-surgical way of treatment is to fit a nail correction brace at the respective nail. Such a brace is described in the German patent specification DE 10 2005 039 147 B3. The brace engages under the nail, which often will lead to tissue irritations. In WO 2011/039243 A1, a multi-layer polymer system is described, wherein it is intended that, by contraction and expansion of different layers in opposite directions, lateral tensile forces on the nail are obtained, with the consequence of a mechanical correction. As has been found, the method described in WO 2011/039243 A1 is not reproducible: All efforts to reproduce such a multi-layer system, which, on the one hand, attaches on the nail and, on the other hand, develops the required correction forces, were not successful.

There is, therefore, a continuing need for means for the correction of misgrown toenails or fingernails.

SUMMARY OF THE INVENTION

Surprisingly, it has been found that the kit for nail correction described in the following avoids the above drawbacks and enables in a simple way a correction of ingrown fingernails or toenails. Depending on the degree of deformation of the nails (in particular on the degree of curvature), different compositions based on photopolymerizable components can be applied. Optionally, one or more metallic spring braces can additionally be used. By the kind of attachment of the metallic spring braces, it can be excluded that mechanical tissue irritations will occur.

The kit for nail correction according to the invention includes
 a) a primer, including
  40-60% of hydroxyethylene methacrylate,
  40-60% of phosphate dimethacrylate,
  0.1-1.0% of a starter,
 b) at least one composition for making a light-curing nail brace, including
  15-45% of bisphenol A (di)methacrylate, urethane dimethacrylate in a proportion from 1:5 to 5:1,
  85-55% of fillers and pigments,
  0.1-1% of camphorquinone, amino starter, and
 c) optionally one or more spring braces.

The component a of the kit according to the invention is a primer, acting as an adhesion agent. During the investigations in connection with the present invention, it has been found that the adhesion of the photopolymer to the nail is critical for the success of the correction method. It turns out that the adhesion of the photopolymer to the nail is significantly improved when the adhesion agent described in the invention is employed as a primer. This adhesion agent includes 40-60% of hydroxyethylene methacrylate and 40-60% of phosphate dimethacrylate and 0.1-1.0% of a polymerization starter. The polymerization starters are described below in more detail. The mixing proportion may vary within the percentages mentioned above. Advantageously, the two methacrylates are included in an approximately identical proportion. It is understood that all components together sum up to 100%.

The actual nail brace is formed by means of the photopolymerizable material b. This is a composition including
 15-45% of bisphenol A (di)methacrylate, urethane dimethacrylate in a proportion from 1:5 to 5:1,
 85-55% of fillers and pigments,
 0.1-1% of camphorquinone, amino starter.

The range of compositions mentioned above allows for a different adjustment of the mechanical properties, in the form of different degrees of hardness. In practice, it has proven to provide two compositions, one of which is comparatively soft, the other one being comparatively hard.

The soft composition includes, for instance,
 17-21% of bisphenol A (di)methacrylate, urethane dimethacrylate in a proportion from 1:4 to 4:1,
 79-83% of fillers and pigments,
 0.1-1% of camphorquinone, amino starter.

The hard composition includes, for instance,
 36-40% of bisphenol A (di)methacrylate, urethane dimethacrylate in a proportion from 1:4 to 4:1,
 60-64% of fillers and pigments,
 0.1-1% of camphorquinone, amino starter.

The monomers bisphenol A (di)methacrylate and urethane dimethacrylate included in the compositions are preferably included in approximately equal amounts. Mixing proportions, wherein the two main components are included in a mass proportion between 1:5 and 5:1, are generally suitable. Particularly preferable are mixing proportions, wherein the two main components are included in a mass proportion between 1:2 and 2:1.

The material for the light-curing nail brace further includes fillers and pigments. These are silicate-based fillers (silica fillers), fillers based on ground barium glass (barium glass fillers) as well as polymeric particles. The particular additions have diameters in the range from 0.1-10 μm, preferably they are smaller than 5 μm. In particular, the barium glass-based fillers significantly contribute to the mechanical properties of the nail brace. In addition, pigments may further be included in the composition, in order to confer an aesthetic appearance to the formed nail brace. Further, the pigments should preferably have diameters in the range from 0.1-10 μm.

The compositions according to the invention further include polymerization starters that can initiate the desired polymerization reaction by irradiation with light. For this purpose, in principle, all classical polymerization starters are suitable. Particularly suitable has proven the combination of camphorquinone with amino starters, namely tertiary amines (e.g., triethanolamine, N,N-dimethyl-p-toluidine, triethylamine, 4-dimethylamino bezoic acid ethyl ester, N,N-tetramethylaniline). Alternatively, for instance, 2-ethylanthraquinone in combination with N-phenylglycine can be used.

When using such a system, surprisingly, the completed composition can be stored over longer times, without a polymerization reaction taking place. Only after illumination with an adjusted light source, the polymerization reaction will occur. For this purpose, e.g., an LED light source with a wavelength of approx. 450 nm and a light power of 1000-1500 mW/cm2 can be used.

Optionally, the kit according to the invention further includes one or more braces made of spring steel. They are made from a spring steel wire having a diameter of 0.3-1.5 mm. The brace may include one or more U-shaped loops. The metal spring brace is applied with the light-curing material described above on top of the respective nail (glued). Different from the therapy methods described above using such metal braces, it is neither required to enclose the nail at the outside, nor to provide for boreholes in the nail. FIG. 4 shows an attachment according to the invention for such a metal brace.

DETAILED DESCRIPTION

The kit according to the invention is used as follows:

First, the therapist removes the concerned nail from the nail bed. In this procedure, a strip of cloth can be inserted between nail and nail bed. Then, the nail is first treated with the primer of the kit. Care has, in particular, to be taken that the nail is dry. The concerned nail should, in particular during the 24 hours before the application, not have been in a longer-lasting contact with water. The patient should, for instance, not have taken a bath. Short washing or showering is, however, harmless, provided that the nail has been carefully dried. If necessary, the nail can be dried with a hot-air blower. The primer is first applied onto the necessary locations. Normally, it is recommended to apply the primer in a sheet-like manner onto the entire nail. After application, the polymerization is started by means of a light source (preferably blue light of approx. 450 nm and 100 mW/cm$^2$). When using a usual light source, the polymerization is completed after a time of 5 seconds to 60 seconds, normally 10 seconds illumination is sufficient.

Figure 1:
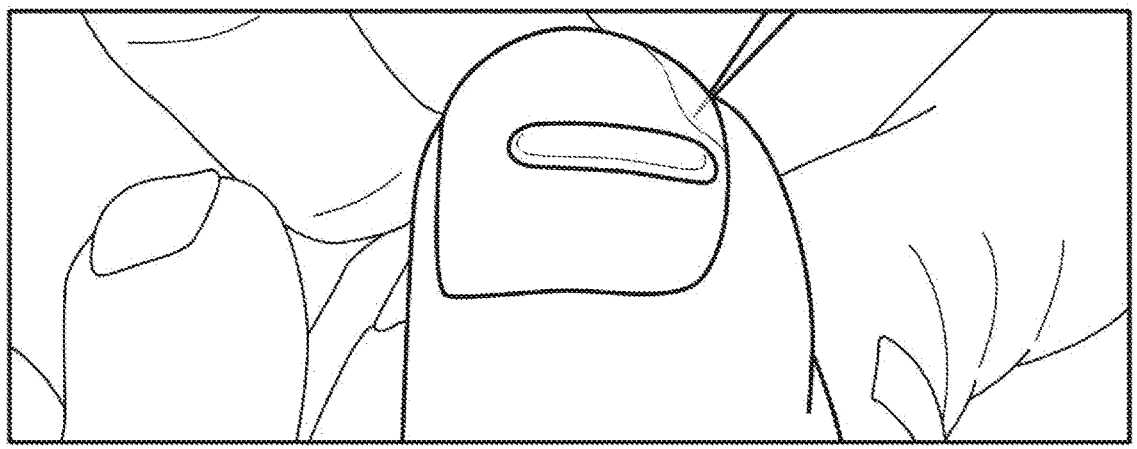
FIG. 1 shows the application of a composition for making a light-curing nail brace onto the nail.
Figure 2:
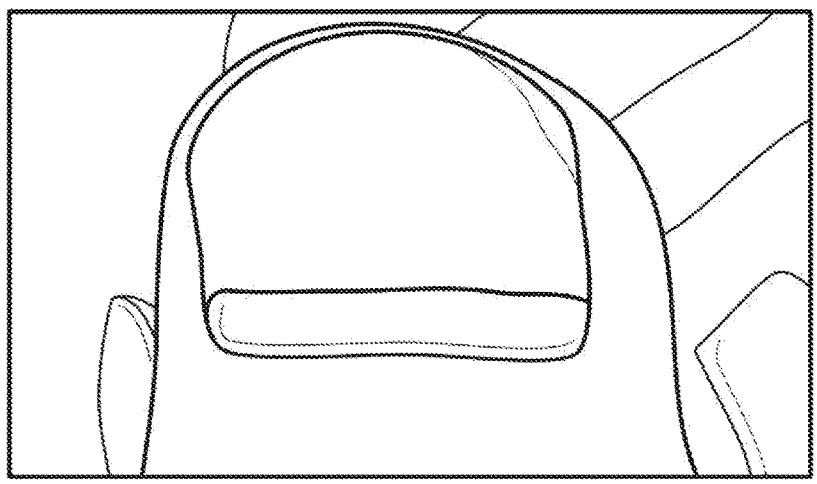
FIG. 2 shows the light-cured composition on the nail close to the nail pocket (after illumination).
Figure 3:
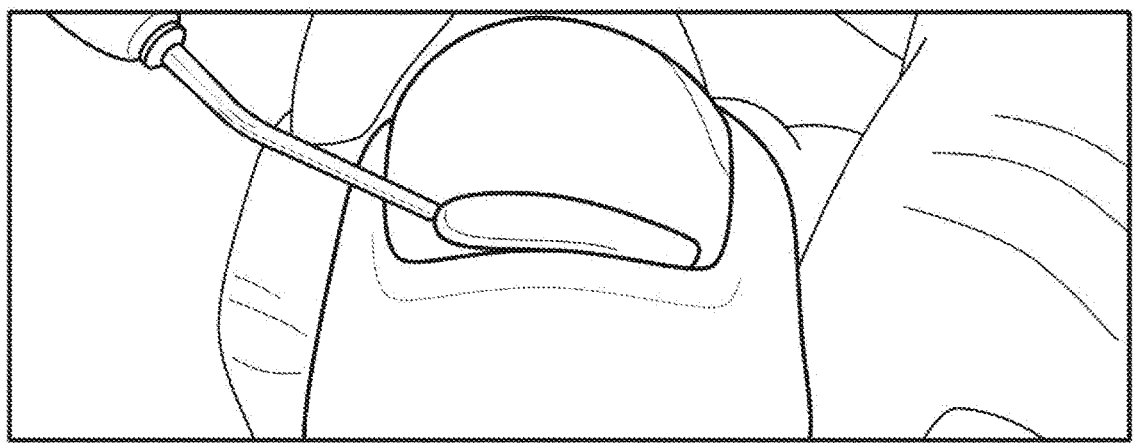
FIG. 3 shows the application of a light-curing composition on the nail close to the nail pocket.
Figure 4:
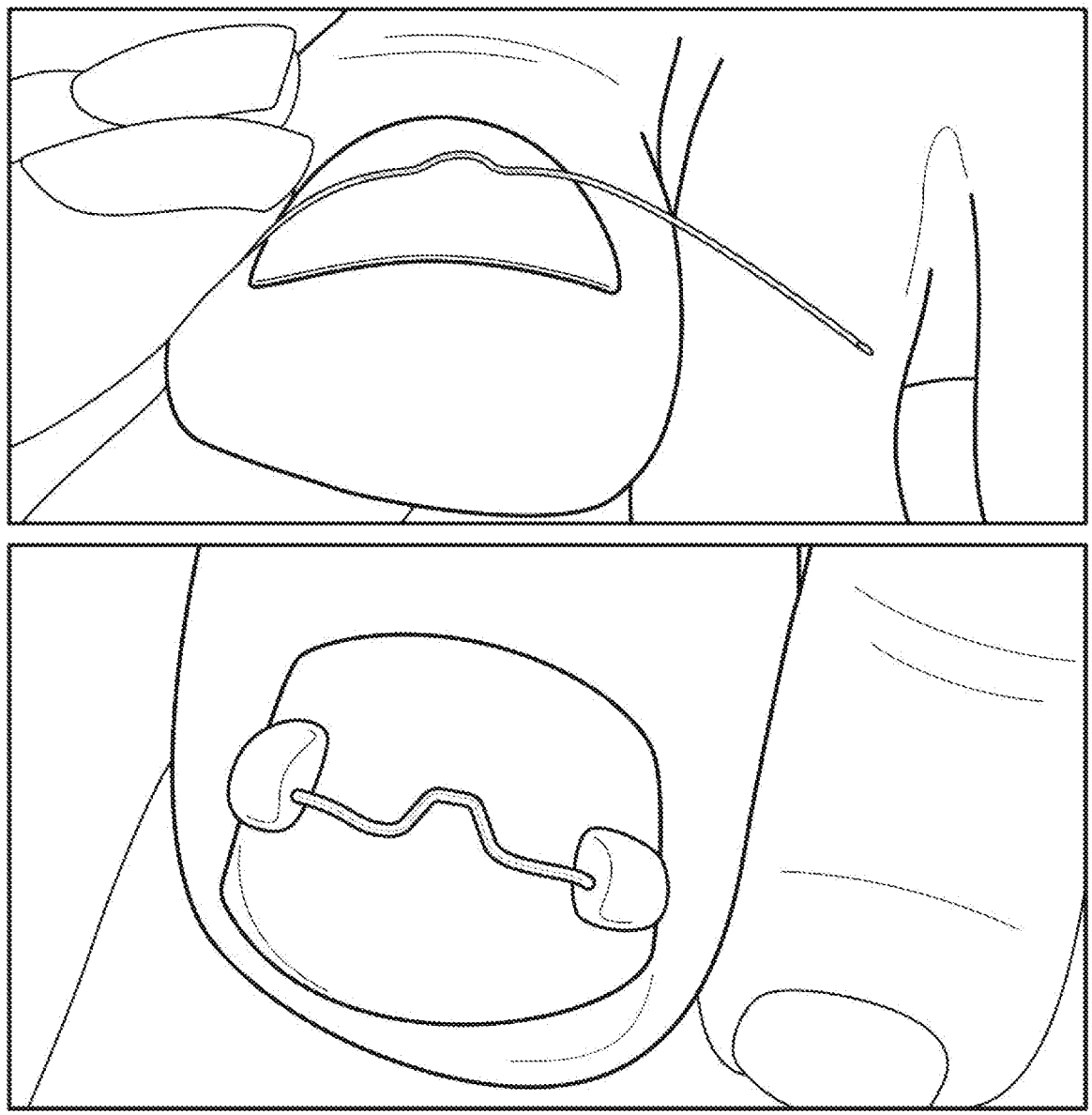
FIG. 4 shows the attachment of a spring brace by means of the kit according to the invention by fixing the first end of the spring brace (top) and then fixing the other end.

Thereafter, the light-curing nail brace is applied. The nail is held by the therapist by means of a tool in the desired position. The application is made in the form of lines (see FIG. 1) with a line width of 2-6 mm. After the application, preferably immediately, the polymerization is started by illumination with the light source mentioned above. It is important, when doing so, to hold the nail in the desired shape. This step, too, is usually completed after a time of 5-60 seconds. Thereafter, the material can again be re-ground, so that no edges will be created, where fabric (e.g., stockings) could get caught. With strongly deformed or very strongly thickened nails, a multitude of such line-shaped applications can be performed. If applicable, very thick nails may also be ground preparatorily, so that the nail is deformable again. Grinding has, of course, to be performed before the priming process with the primer. The photopolymer may also be applied in a correspondingly thicker layer. In an extreme case, a metallic spring brace may be applied. For this purpose, first, a drop of the light-curing material is applied as a point, and the spring brace is pressed into this drop (FIG. 4). After light-curing of the drop, the spring brace is spanned over the nail and fixed by means of a second drop of the photopolymerizing material. The two ends of the metal brace should each be visible from the inside of the drop. In this embodiment, too, a preparation of the nail using the primer is required, since otherwise the durability of the construct on the nail cannot be guaranteed.

By means of the kit according to the invention, it is also possible to enable another correction of a nail already treated with a metal brace. In particular, in the case of a tissue irritation (nail bed irritation) by the classical metal brace, the classical metal brace can be removed, and the nail is then further treated with the kit according to the invention.

The compositions provided in the kit are preferably supplied in correspondingly designed containers. For the primer, in principle, vials made of glass or plastic with an application brush are suitable. The compositions for making light-curing nail braces are typically more viscous and are preferably supplied in cartridges for use together with a cartridge press or gun. All containers are preferably opaque.

With the kit according to the invention, the necessary materials are provided, in order to correct ingrown toenails or fingernails for humans or animals, without the drawbacks of prior art occurring. In most cases, the nail correction can be performed without the aid of metallic braces. The composition according to the invention, in particular, guarantees a clearly better adhesion to the nail than prior art compositions. Furthermore, the advantages of a polymer can be combined with those of a metal brace, without the drawbacks occurring that frequently appeared in prior metal braces, in particular mechanical irritations of the nail bed.

In an improvement of the composition according to the invention, the primer additionally includes one or more antimicotics. As has been found in practice, nails needing a correction are frequently infested by nail fungi causing additional problems. It is known that nail fungi cannot easily be treated. It turned out that the nail fungus treatment is successful, when the primer additionally includes one or more antimicotics. The admixture is normally 0.1-2%, preferably 0.5-1%. As an antimcotic, generally compounds are suitable that are approved for the treatment of onychomycoses, such as, for instance, econazole, bifonazole, chlodrimazole, fenticonazole, ketocanazole, miconazole, oxiconazole, and related compounds.

In the embodiment of the invention with an addition of antimycotics, the complementing addition of penetration amplifiers has proven successful. For this purpose, the usual penetration amplifiers for nail penetration can be used. Particularly successful for the present invention have proven penetration amplifiers based on substituted 1,3-dioxolanes, 1,5-dioxanes and acetals, in particular the substances and substance mixtures marketed under the trademark SEPA®.

EXAMPLES

The invention is further explained by the compositions exemplarily illustrated in the following:

A) Primer

| Component | A1 (wt.-%) | A2 (wt.-%) | A3 (wt.-%) | A4 (wt.-%) |
|---|---|---|---|---|
| Hydroxyethylene methacrylate | 49.7 | 39.7 | 35.7 | 45.7 |
| Phosphate dimethacrylate [bis(glyceryl-dimethacrylate) phosphate] | 49.7 | 59.7 | 54.6 | 44.7 |
| Camphorquinone | 0.4 | 0.4 | 0.5 | 0.4 |
| Triethylamine | 0.2 | | 0.1 | 0.2 |
| N,N-Dimethyl-p-toluidine | | 0.2 | 0.1 | |

B) Nail brace (soft)

| Component | B1 (wt.-%) | B2 (wt.-%) | B3 (wt.-%) | B4 (wt.-%) | B5 (wt.-%) |
|---|---|---|---|---|---|
| Bisphenol A (di)methacrylate | 16.0 | 15.0 | 14.0 | 30.0 | 22.0 |
| Urethane dimethacrylate | 16.0 | 30.0 | 30.0 | 15.0 | 22.0 |
| Silica filler (Aerosil 9200) | 20.0 | 0.0 | 17.0 | 16.5 | 18.5 |
| Silica filler (Aerosil 7200) | 5.0 | 10.3 | 15.0 | 12.5 | 4.5 |
| Barium glass (median particle size: 13 μm) | 18.0 | 13.0 | 13.0 | 12.0 | 14.5.0 |
| Barium glass (median particle size: 5 μm) | 3.9 | 14.0 | 5.2 | 5.0 | 5.5 |
| Polymeric particle (median particle size: 10 μm) | 20.0 | 12.0 | 4.0 | 4.5 | 8.0 |
| Polymeric particle (median particle size: 6 μm) | 0.0 | 5.0 | 1.0 | 3.5 | 4.0 |
| Camphorquinone | 0.6 | 0.4 | 0.5 | 0.6 | 0.0 |
| Triethylamine | 0.5 | 0.0 | 0.1 | 0.4 | 0.0 |
| N,N-Dimethyl-p-toluidine | 0.0 | 0.3 | 0.2 | 0.0 | 0.0 |
| 2-Ethylanthraquinone | 0.0 | 0.0 | 0.0 | 0.0 | 0.6 |
| N-Phenylglycine | 0.0 | 0.0 | 0.0 | 0.0 | 0.4 |

C) Nail brace (hard)

| Component | C1 (wt.-%) | C2 (wt.-%) | C3 (wt.-%) | C4 (wt.-%) | C5 (wt.-%) |
|---|---|---|---|---|---|
| Bisphenol A (di)methacrylate | 20.0 | 25.0 | 18.0 | 19.0 | 15.0 |
| Urethane dimethacrylate | 20.0 | 13.0 | 20.0 | 20.0 | 23.0 |
| Silica filler (Aerosil 9200) | 20.0 | 0.0 | 18.0 | 16.5 | 19.5 |
| Silica filler (Aerosil 7200) | 5.0 | 13.3 | 16.0 | 15.5 | 5.5 |
| Barium glass (median particle size: 13 μm) | 16.0 | 14.0 | 12.5 | 12.0 | 12.5 |
| Barium glass (median particle size: 5 μm) | 3.9 | 16.1 | 7.0 | 6.5 | 8.5 |
| Polymeric particle (median particle size: 10 μm) | 14.0 | 12.0 | 6.2 | 6.0 | 11.0 |
| Polymeric particle (median particle size: 6 μm) | 0.0 | 5.0 | 1.0 | 3.5 | 4.0 |
| Camphorquinone | 0.6 | 0.8 | 0.7 | 0.6 | 0.0 |
| Triethylamine | 0.5 | 0.0 | 0.2 | 0.4 | 0.0 |
| N,N-Dimethyl-p-toluidine | 0.0 | 0.8 | 0.4 | 0.0 | 0.0 |
| 2-Ethylanthraquinone | 0.0 | 0.0 | 0.0 | 0.0 | 0.6 |
| N-Phenylglycine | 0.0 | 0.0 | 0.0 | 0.0 | 0.4 |

What is claimed is:

1. A kit for the correction of a fingernail or toenail, including
   a) an adhesion enhancer, comprising
      40-60% of hydroxyethylene methacrylate,
      40-60% of phosphate dimethacrylate,
      0.1-1.0% of starter,
   b) at least one composition for making a light-curing nail brace, including
      15-45% of bisphenol A (di)methacrylate, urethane dimethacrylate in a proportion from 1:5 to 5:1,
      85-55% of fillers and pigments,
      0.1-1% of camphorquinone, amino starter.

2. The kit for the correction of a fingernail or toenail according to claim 1, additionally including one or more spring braces.

3. The kit for the correction of a fingernail or toenail according to claim 1, including
   two compositions for making light-curing nail braces, namely a first composition including
      17-21% of bisphenol A (di)methacrylate, urethane dimethacrylate in a proportion from 1:4 to 4:1,
      79-83% of fillers and pigments
      0.1-1% of camphorquinone, amino starter,
   and a second composition including
      36-40% of bisphenol A (di)methacrylate, urethane dimethacrylate in a proportion from 1:4 to 4:1,
      60-64% of fillers and pigments
      0.1-1% of camphorquinone, amino starter.

4. The kit for the correction of a fingernail or toenail according to claim 1, wherein the amino starter is 4-dimethylamino benzoic acid ethyl ester.

5. The kit for the correction of a fingernail or toenail according to claim 1, wherein the adhesion enhancer includes 0.1-2% of at least one antymicotic.

6. The kit for the correction of a fingernail or toenail according to claim 1, wherein at least one antymicotic is selected from the group consisting of econazole, bifonazole, chlodrimazole, fenticonazole, ketocanazole, miconazole, oxiconazole.

7. The kit for the correction of a fingernail or toenail according to claim 1, in which the light-curing brace is made from a composition including 17-21% of bisphenol A (di)methacrylate, urethane dimethacrylate in a proportion from 1:4 to 4:1, 79-83% of fillers and pigments, 0.1-1% of camphorquinone, amino starter.

8. A method for performing a nail correction for a human or animal toenail or fingernail including the steps of
   a) removing the concerned nail from the nail bed, treating the dry nail with an adhesion enhancer comprising,
      40-60% of hydroxyethylene methacrylate,
      40-60% of phosphate dimethacrylate,
      0.1-1.0% of starter, b) illuminating the adhesion enhancer with a light source to initiate polymerisation,
c) application of a metallic spring brace by applying a first drop of a photopolymerizing material, the metallic brace being pressed into said drop,
d) light-curing of said first drop of a photopolymerizing material,
e) spanning the metallic brace over the nail and fixing by means of a second drop of a photopolymerizing material, the metallic brace being pressed into said second drop,
f) light-curing of said second drop of a photopolymerizing material.

9. The method according to claim 8 in which the light-curing brace is made from a composition including 15-45% of bisphenol A (di)methacrylate, urethane dimethacrylate in a proportion from 1:5 to 5:1, 85-55% of fillers and pigments, 0.1-1% of camphorquinone, amino starter.

10. The method according to claim 8 in which the light-curing brace is made from a composition including 17-21% of bisphenol A (di)methacrylate, urethane dimethacrylate in a proportion from 1:4 to 4:1, 79-83% of fillers and pigments, 0.1-1% of camphorquinone, amino starter.

11. The method according to claim 8 in which the illuminating steps are made by application of blue light of approximately 450 nm and 100 mW/cm2 for a time of 5 seconds to 60 seconds.

\* \* \* \* \*